US012282462B2

(12) United States Patent
Pillai et al.

(10) Patent No.: US 12,282,462 B2
(45) Date of Patent: Apr. 22, 2025

(54) WELL RECORD QUALITY ENHANCEMENT AND VISUALIZATION

(71) Applicant: Schlumberger Technology Corporation, Sugar Land, TX (US)

(72) Inventors: Prashanth Pillai, Pune (IN); Purnaprajna Raghavendra Mangsuli, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/155,133

(22) Filed: Jan. 17, 2023

(65) Prior Publication Data

US 2024/0241868 A1 Jul. 18, 2024

(51) Int. Cl.
*G06F 16/215* (2019.01)
*G06F 16/28* (2019.01)
*G06F 16/93* (2019.01)

(52) U.S. Cl.
CPC .......... *G06F 16/215* (2019.01); *G06F 16/287* (2019.01); *G06F 16/93* (2019.01)

(58) Field of Classification Search
None
See application file for complete search history.

(56) References Cited

U.S. PATENT DOCUMENTS

| 10,984,231 | B1 * | 4/2021 | Vandivere | G06Q 50/163 |
|---|---|---|---|---|
| 2009/0020284 | A1 | 1/2009 | Graf | |
| 2021/0233008 | A1 * | 7/2021 | Gupta | G06Q 50/02 |
| 2022/0010675 | A1 | 1/2022 | Yin | |
| 2022/0083519 | A1 * | 3/2022 | Xu | G16H 50/20 |
| 2023/0036713 | A1 * | 2/2023 | Pattnaik | E21B 47/0025 |

FOREIGN PATENT DOCUMENTS

WO WO-2018132786 A1 * 7/2018 ............... G01V 1/50

OTHER PUBLICATIONS

M.D. Zobacka; Determination of stress orientation and magnitude in deep wells International Journal of Rock Mechanic and Mining Sciences; 2003; pp. 1050-1076 (Year: 2003).*
Runhai Feng; Imputation of missing well log data by random forest and its uncertainty analysis; Elsevier; 2021; pp. 1-9.*
Extended Search Report issued in European Patent Application No. 24152298.6 dated Jun. 11, 2024, 7 pages.

* cited by examiner

*Primary Examiner* — Ann J Lo
*Assistant Examiner* — Jermaine A Mincey
(74) *Attorney, Agent, or Firm* — Michael Guthrie; Jeffrey D. Frantz (57) ABSTRACT

A method includes identifying entities in a well record database comprising data representing a plurality of objects and attributes of the objects, determining a data gap for at least one attribute of an object of the objects in the well record database, identifying documents in a document database, wherein identifying the documents include determining that the documents are relevant to the object based at least in part on metadata of the documents, extracting values for the data gap from the documents using a machine learning model, determining a data gap filler by aggregating the extracted values, and inserting the data gap filler into the data gap in the well log database.

18 Claims, 7 Drawing Sheets

WELL RECORD QUALITY ENHANCEMENT AND VISUALIZATION

BACKGROUND

Well reports are a rich source of well header information like well depths, spud date, completion date, geospatial surface/target coordinates, well status, operator, etc. Building a structured representation of this information from well reports can benefit subsequent workflows related to offset well analysis, well exploration, predictive maintenance, etc. Oil exploration and production companies constantly strive towards maintaining high data quality of their well header database.

However, gaps in the data may exist, e.g., where certain attributes of a well should be present but are missing. Such gaps can be caused by inadvertent omissions/mistakes during the data-entry process, either as a consequence of human-error in what is generally a manual process, or from pre-existing gaps in the original data sources used to populate the well records. These gaps can negatively affect the "quality" of the overall data set representing a well or a series of wells in a database, thereby reducing the confidence of inferences drawn from this data, e.g., for well planning. Accordingly, data gaps in such large databases are filled by referring to unstructured data sources of information like well reports and well logs. However, this process is performed manually to find values for the missing data, which can be a time-consuming process. Moreover, even if a datapoint is found for a data gap, it may be contradicted by another well log, which might not be located, because the searcher may stop searching after finding the first datapoint to fill the gap.

Well reports are a rich source of well header information like well depths, spud date, completion date, geospatial surface/target coordinates, well status, operator, etc. Building a structured representation of this information from well reports can benefit subsequent workflows related to offset well analysis, well exploration, predictive maintenance, etc. Oil exploration and production companies constantly strive towards maintaining high data quality of their well header database.

SUMMARY

Embodiments of the disclosure include a method that includes identifying entities in a well record database comprising data representing a plurality of objects and attributes of the objects, determining a data gap for at least one attribute of an object of the objects in the well record database, identifying documents in a document database, wherein identifying the documents include determining that the documents are relevant to the object based at least in part on metadata of the documents, extracting values for the data gap from the documents using a machine learning model, determining a data gap filler by aggregating the extracted values, and inserting the data gap filler into the data gap in the well log database.

Embodiments of the disclosure include a computing system including one or more processors and a memory system including one or more non-transitory, computer-readable media storing instructions that, when executed by at least one of the one or more processors, cause the computing system to perform operations, the operations including identifying entities in a well record database comprising data representing a plurality of objects and attributes of the objects, determining a data gap for at least one attribute of an object of the objects in the well record database, identifying documents in a document database, wherein identifying the documents include determining that the documents are relevant to the object based at least in part on metadata of the documents, extracting values for the data gap from the documents using a machine learning model, determining a data gap filler by aggregating the extracted values, and inserting the data gap filler into the data gap in the well log database.

Embodiments of the disclosure include a non-transitory, computer-readable medium storing instructions that, when executed by at least one processor of a computing system, cause the computing system to perform operations, the operations including identifying entities in a well record database comprising data representing a plurality of objects and attributes of the objects, determining a data gap for at least one attribute of an object of the objects in the well record database, identifying documents in a document database, wherein identifying the documents include determining that the documents are relevant to the object based at least in part on metadata of the documents, extracting values for the data gap from the documents using a machine learning model, determining a data gap filler by aggregating the extracted values, and inserting the data gap filler into the data gap in the well log database.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
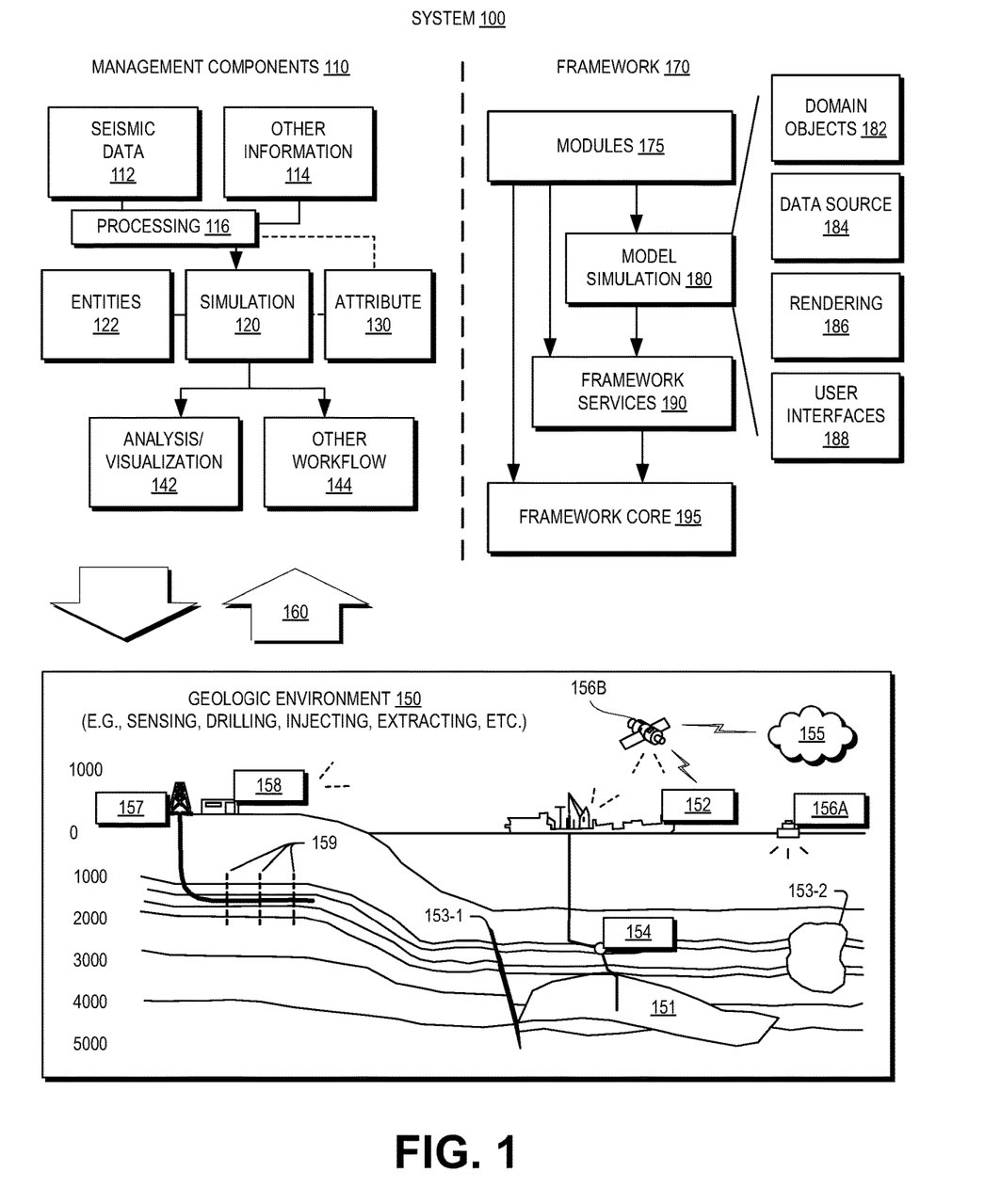
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
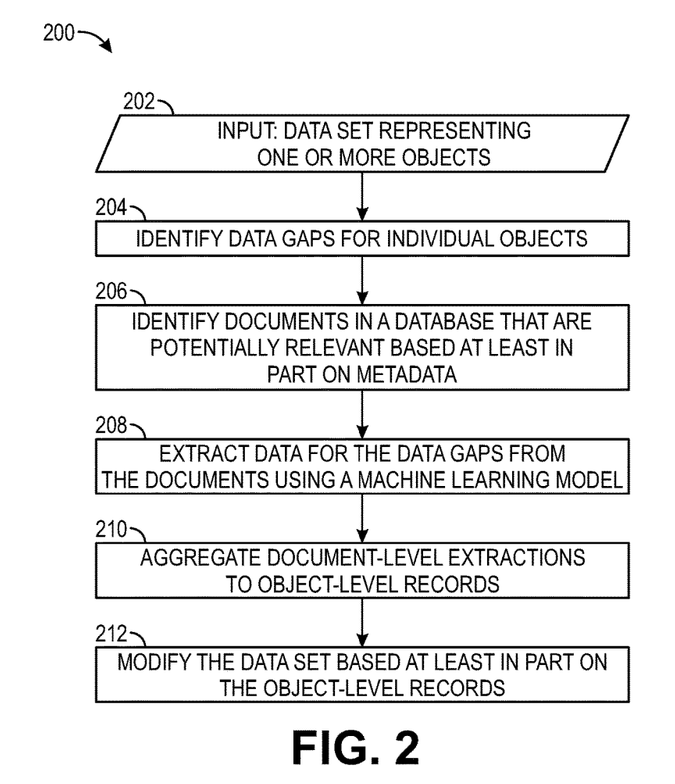
FIG. 2 illustrates a flowchart of a method for enhancing and visualizing a well record utilizing information from well documents, according to an embodiment.

FIG. 2 illustrates a flowchart of a method 200 for enhancing and visualizing a well record utilizing information from well documents, according to an embodiment. The method 200 may begin by receiving a data set representing one or more objects, as at 202. In particular, the data set may be in a "data store" including one or more databases, which is owned by a corporate entity, for example, a well owner or another well services company. Accordingly, a data store refers to a storage location for one or more databases, e.g., a server, cloud storage, etc. The objects may be wells, according to at least one embodiment. Further, the data set may include attributes of the objects (e.g., wells), such as, for example, location/coordinates, well depth, water depth, well geometries, formation properties, etc. In at least one embodiment, the data set may be provided as a well object, such as in a file of type .xlsx, .es, .json, .las, etc., which may represent various characteristics of a well.

Figure 3:
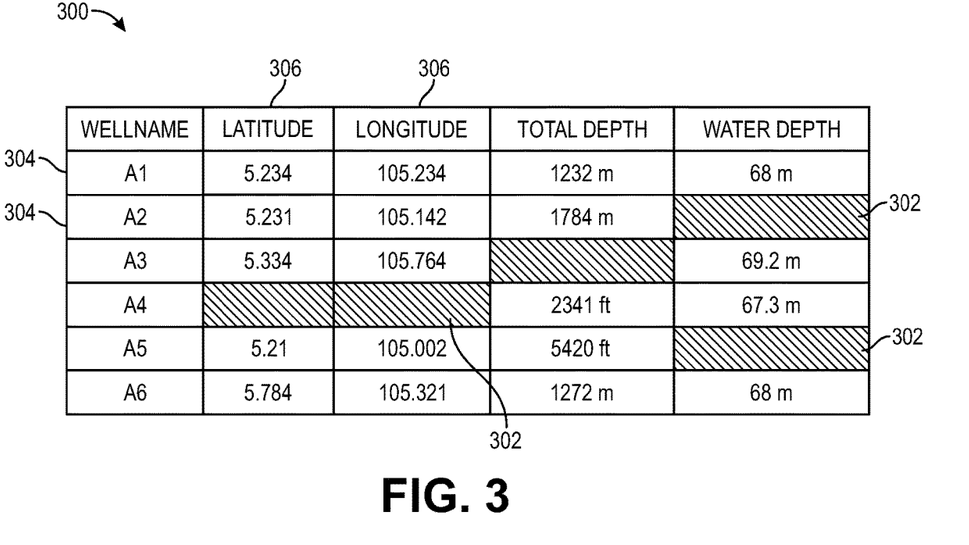
FIG. 3 illustrates an example of a data set with gaps contained therein.

The method 200 may then include identifying data gaps within the data set for individual objects, as at 204. FIG. 3 illustrates an example of a data set 300 with gaps 302 contained therein. As shown, the data set 300 may include rows 304 corresponding to the objects, e.g., individual wells. The data set 300 may also include several columns 306 corresponding to attributes of the wells. The gaps 302 represent missing information. The data set 300 may be gleaned from well reports, well logs, e.g., in particular, well log headers which may provide information that identifies the well, summarizes the well log and inferences drawn therefrom, and/or provides other information about the attributes of the well. As noted above, the aggregation of the data from the well reports and well logs may be a manual job, and/or may rely on incomplete or poor-quality image inputs, which can lead to spurious, or, as shown, incomplete, data.

Returning to FIG. 2, the method 200 may include accessing another data store, e.g., storing a document database. This second data store may be publicly-accessible, proprietary to another vendor, or a data store that is owned by the well services provider. From this second data store, the method 200 may extract data to fill the identified data gaps from documents provided in the data store using a machine learning model, as at 206. The documents may include, for a single data gap, several different types of well logs, e.g., end of well report, final well report, completion reports, etc., for a single well ("object"). The machine learning model may be, for example, a convolutional neural network, but any suitable machine learning model may be employed. Additional details of the process for identifying and extracting data from the second data store for the data gaps is provided below, according to an embodiment. The data extracted may be contained in individual documents, and thus is "document-level" data. The document level data can include several different instances of data that may fill the data gaps, and the data may be the same or may represent a range of different values.

The method 200 may thus also include aggregating the document-level extractions to object-level records, as at 210. For example, statistical techniques may be provided to determine a value with a highest confidence level, which may then be selected. Accordingly, inconsistencies can be mitigated, e.g., by using data that is likely to be accurate, e.g., based on frequency of use, physical constraints, quality of other data in the report, etc.

Once the object-level records are generated, the method 200 may include modifying the data set based at least in part thereon, as at 212. That is, the object-level records ("data gap fillers") can be used to write into ("fill") the data gaps identified in the database, thereby enhancing/increasing the quality of the database representing the individual objects (wells). This database may then be used for subsequent drilling operations, e.g., through offset well analysis. Accordingly, the quality of the data may enhance the decision-making of operators and planners for subsequent well operations. Further, the database, data quality, etc. can be visualized, so that such operators/planners can make decisions based on such enhanced data.

Figure 4:
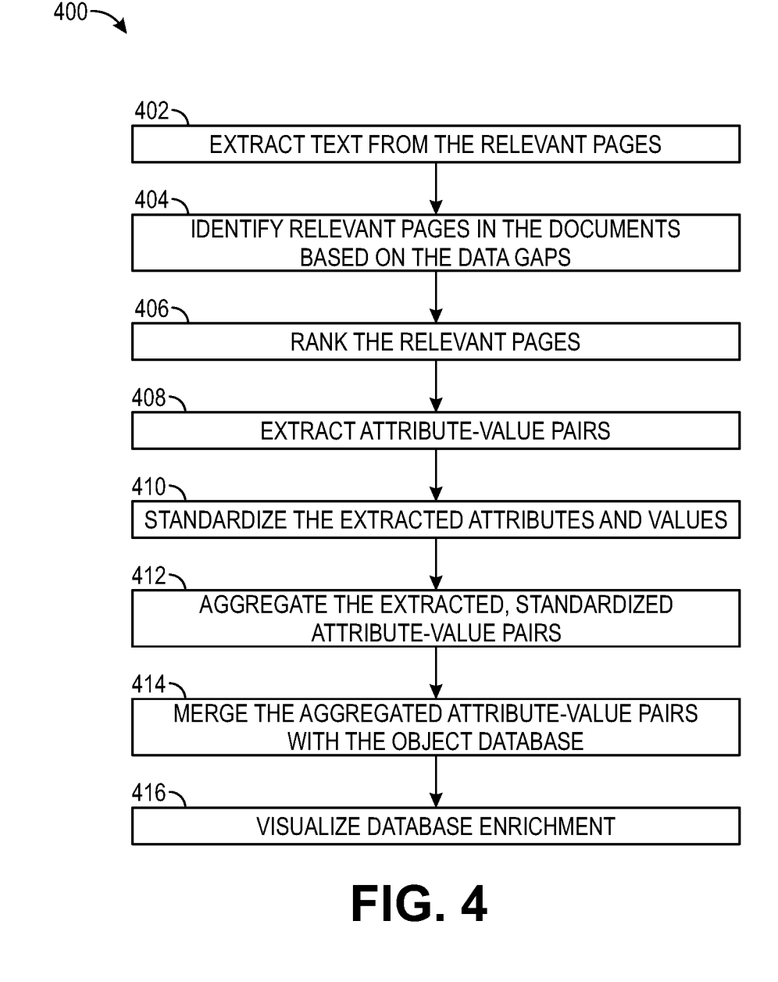
FIG. 4 illustrates a flowchart of a method for identifying object-level data, e.g., providing an example of at least a part of the method, according to an embodiment.

FIG. 4 illustrates a flowchart of a method 400 for identifying object-level data, e.g., providing an example of at least a part of the method 200, according to an embodiment. As noted above, a machine learning model may be trained to identify documents that are potentially relevant to an object/data gap based on various metadata, filenames, etc. However, each document may contain many pages, while the relevant information to be extracted may be found in a relatively small subset of these pages, e.g., one section or a few sections of the document. The method 400 may thus include parsing the individual pages to identify those that are relevant to the object and specific data gaps. For example, the method 400 may include extracting text from (e.g., image-based) documents, as at 402. The method 400 may include using the machine learning model to predict that certain pages are more relevant than others based on the extracted text, as at 404. For example, pages may be identified as relevant based on repetition of a given word or phrase that indicates relevance to a type of data (e.g., "water depth" when searching for a water depth, or "coordinates" when searching for a location of the well). In other embodiments, the pages may be separated based on topic, with the machine learning model having been trained to identify a topic of the page based on patterns in the different types of documents (e.g., geological sections, drilling operating summary, casing diagrams, stratigraphy charts etc), words used, etc), and words and/or images used, etc.

The relevant pages may then be ordered, e.g., ranked, as at 406, based on their relevance. The ranking based on relevance may refer to the number of times a word or phrase, as noted above, appears or, in other embodiments, if the pages are parsed by topic, the relevant topics may be identified and the pages associated therewith ranked higher than others.

Once the text is extracted and the pages are ranked, the data for the data gaps may be identified and attribute-value pairs may be extracted, as at 408. The attribute may be the type of information missing, e.g., well location coordinates, water depth, etc. The value may be the value (e.g., the numerical coordinates, the depth measurement where water is found, etc.).

The values for the attributes extracted from various well documents may not be uniform in terms of one or more of syntax, reference systems, and/or measurement units, across databases, however. Accordingly, the values for the extracted attribute-value pairs may be standardized, as at 410. For example, some documents may use different coordinate systems for the location of the well (or other object), and some documents may use metric measurements while others use standard measurements. Accordingly, the method 400 may include implementations in which the data is recognized and converted to a standard form.

The method 400 may then aggregate the extracted, standardized attribute-value pairs, as at 412. For example, a statistical choice such as mode or average may be employed to select a value for the data gap with a relatively high level of confidence. Thus, the provision of multiple attribute-value pairs may provide for increased confidence in the filling of the data gap.

The method 400 may also include merging the original database, which includes the data gaps, with the attribute-value pairs extracted from the documents in the second data store, as at 414. Various different database merging techniques may be employed in order to efficiently merge the databases and thereby fill the data gaps. Further, a visualization may be provided, as at 416, of the data enhancement. Such visualization is a practical application of an embodiment of the present method, because, not only is the database operation an enhancement to the functioning of a computing system, but the visualization itself provides a fast and easily understandable indication of the reliability of the dataset that well drillers, operators, planners, etc., may refer to in order to make decisions about physical systems implementations (e.g., control parameters, potentially automatically based on the quality of the data). Moreover, the visualization may have provisions to collect and document feedback from end-users to enable retraining the machine learning workflows.

Figure 5A:
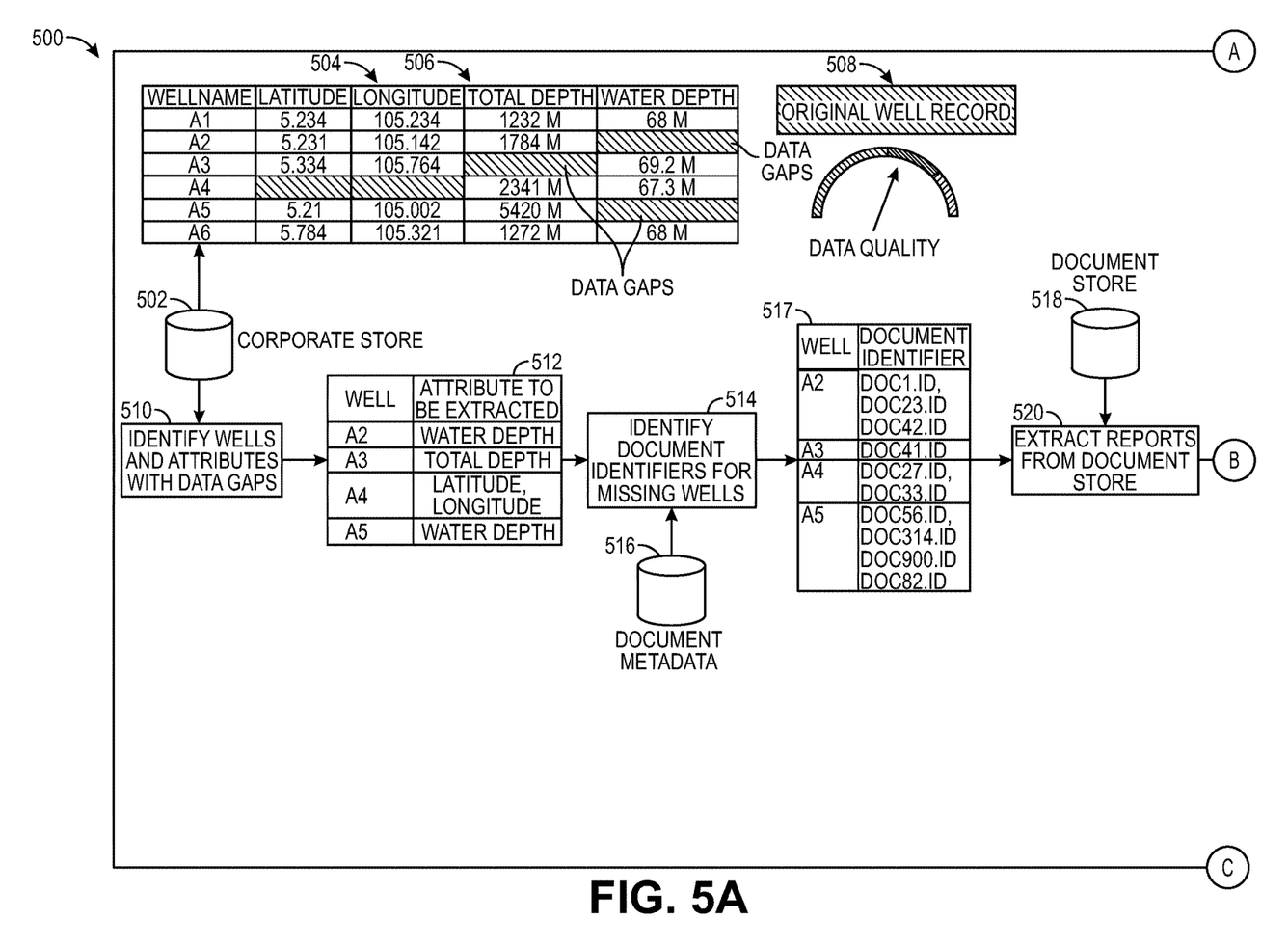
FIGS. 5A and 5B illustrate a functional block diagram of a workflow, including examples of a visualization of the data quality dashboard, according to an embodiment.
Figure 5B:
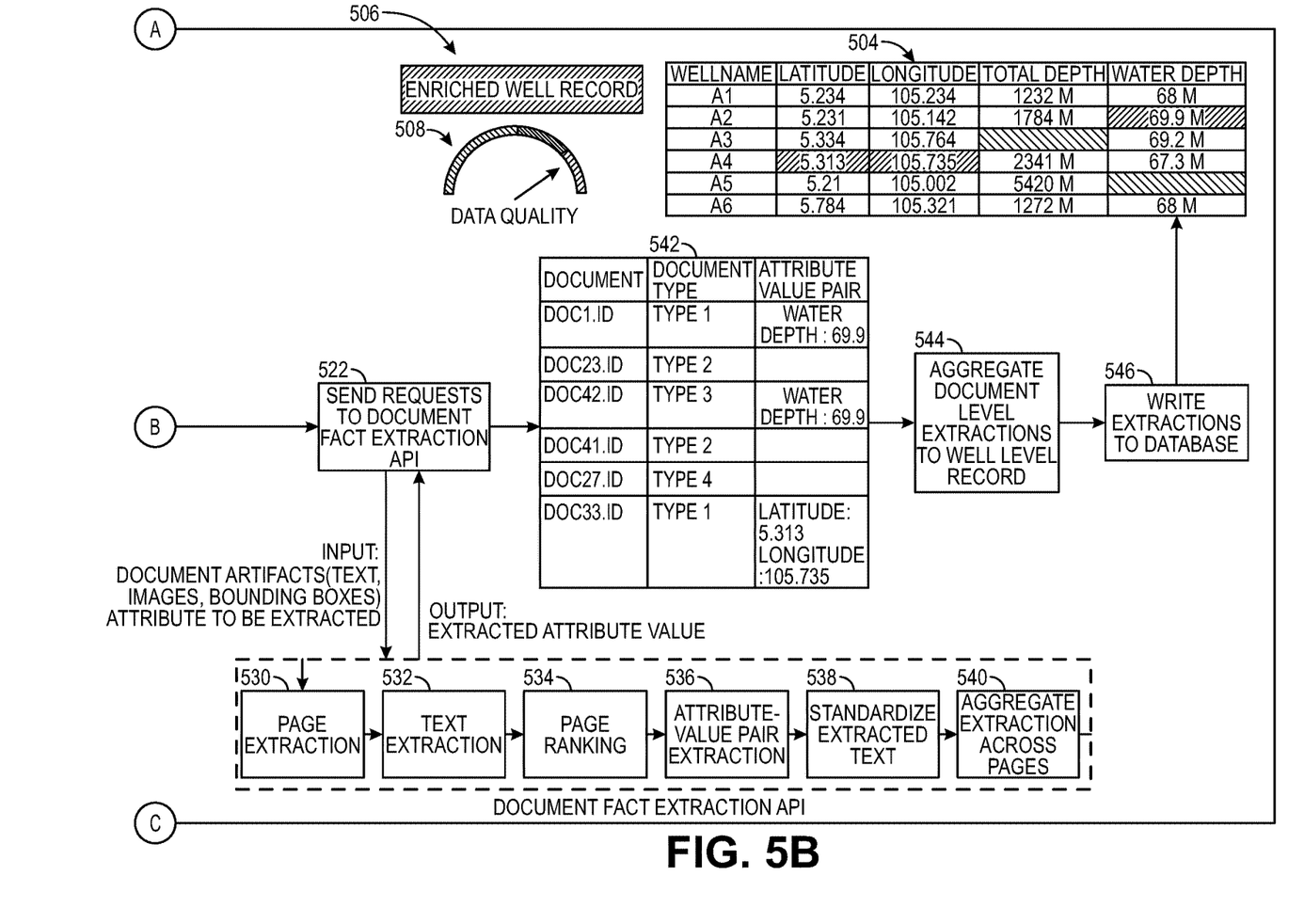

FIGS. 5A and 5B illustrate a functional block diagram of a workflow 500, including examples of a visualization of the data quality dashboard, according to an embodiment. The workflow 500 may begin by receiving a corporate store 502, which may include tables 504 of objects (e.g., wells) and attributes associated therewith, such as location (latitude and longitude), depth, water depth, and/or any other attribute. The tables 504 may be displayed or "visualized" as part of a dashboard 506, which may also show a data quality measurement 508. The data quality measurement 508 may be a qualitative indicator of relative quality (e.g., completeness) of the data set, e.g., on a scale from good to poor. The tables 504 may have data gaps, which may influence the data quality measurement 508, with more gaps yielding lower quality.

The workflow 500 may also include identifying wells and attributes with data gaps 510, as noted above, in the tables 504. A table 512 identifying the gaps and the wells associated therewith may be generated, providing a listing of what gaps that the workflow 500 is seeking to fill.

The workflow 500 may then proceed to identifying document identifiers for missing wells 514, e.g., by accessing document metadata 516 and/or other document information. The document metadata 516 may provide identifiers 517, which may be filenames or other data configured to identify particular documents within a document store 518, e.g., in association with the well. That is, the wells may be associated with particular documents based on the document metadata 516, and the workflow 500 may leverage the metadata to direct the search efforts for information related to the individual wells with data gaps.

The workflow 500 may then extract reports 520 from the data store, based on the documents being indicated as relevant based on the metadata. The workflow 500 may then access and send requests to a document fact extraction application program interface (API) 522. The API 522 call may initiate the machine learning model, which may be trained to parse the documents, and identify attribute-value pairs, if they are present, that fill in the data gaps. In particular, the API 522 call may include page extraction 530 (e.g., determining which pages are relevant). The API 522 call may also include text extraction 532, page ranking 534, attribute-value pair extraction 536, standardization of extracted text 538, and aggregation of the extracted attribute-value pairs 540, as described above.

The extracted attribute-value pairs may then be fed back to the main workflow 500, yielding, for example, a table 542 of documents, document types, and attribute-value pairs. As noted above, the API 522 may be able to search across a variety of different document types for missing data. This table 542 may thus represent "document-level extractions"; that is, data extracted from the documents, which may be duplicative, contradictory, etc. The workflow 500 may then include aggregate document-level extractions to well-level records 544. These well-level records 544 may represent predictions of the missing data based on the well records that are not part of the initial corporate store 502, e.g., "data gap fillers". The data gap fillers may then be written to the tables 504, as at 564, so as to fill one or more of the data gaps. This in turn may increase the data quality, causing the data quality measurement 506 to increase.

Figure 6:
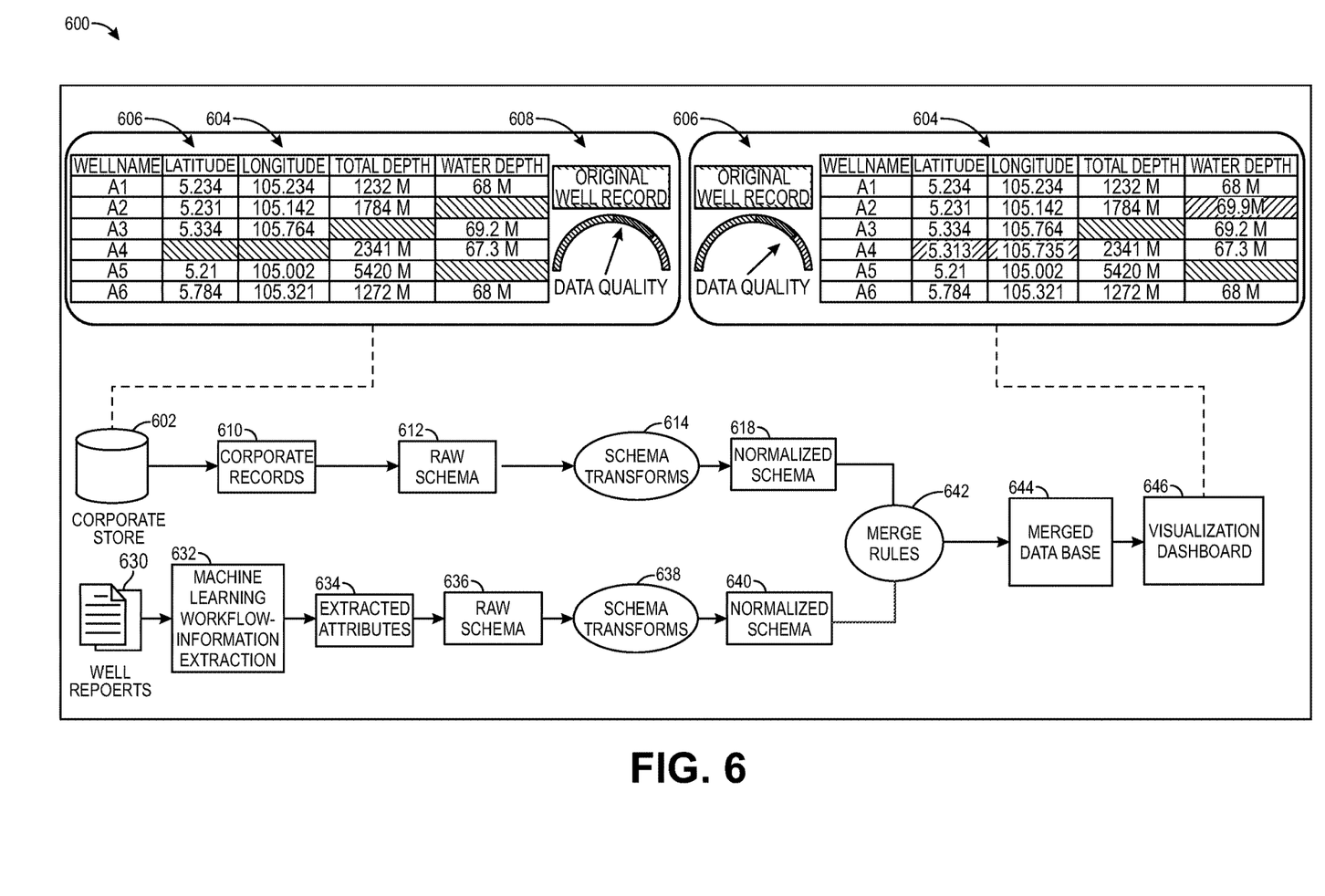
FIG. 6 illustrates a functional block diagram of another workflow, showing standardization with the second or "corporate" database, according to an embodiment.

FIG. 6 illustrates a functional block diagram of another workflow 600, showing standardization with the second or "corporate" database, according to an embodiment. The workflow 600 may be or include an implementation of one or more of the methods 200, 400 discussed above. As shown, the workflow 600 may begin with receiving a corporate database 602, which may include one or more tables of objects and associated attributes, e.g., wells owned or operated by a particular entity. A dashboard 604 may be visualized for the corporate database 602, showing a table 606 and a data quality measurement 608. The table 606 may be the same as shown in FIG. 3, including data gaps etc. for attributes associated with a well (or another object). For example, the database may include wells, with the attributes include coordinates (latitude and longitude) and depth information (e.g., total depth and water depth). Many other types of attributes may be included in such tables, with the foregoing examples being just a few among many contemplated. The data quality measurement 608 may show a relative quality, and may not display a value but a qualitative indication of relative data quality, e.g., a scale or gauge of good-bad data quality. The quality may be based, for example, on a number or frequency of data gaps, or any other statistical measure of how the data gaps influence the completeness of the data in the database.

The workflow 600 may extract corporate records 610 from the database 602. The unaltered corporate records 610, e.g., the tables 606, may not be in a standard format but may be in a "raw" schema 612. Accordingly, the schema of the tables 606 may be transformed at 614 to a normalized schema 618.

Before, during, or after such normalizing at 618, well reports 630 may be received, e.g., from a second database (or data store). The machine learning model may be applied to the well reports 630, as at 632, in order to extract, aggregate, etc., the attribute-value pairs for the data gaps, as discussed above. The extracted attributes 634 may be in a "raw" schema 636 which may or may not be the same as the raw schema 612. Accordingly, to ensure the same schema is applied, the raw schema 636 is transformed at 638 to generate the attributes in the normalized schema 640. For example, units may be converted, attribute names changed, etc. Once both the database schema is normalized at 618 and the extracted attributes are normalized at 640, the database and the extracted attributes may be merged using merge rules 642. As a result, a merged database is generated, which includes the information of the original database 602, along with the attribute-value pairings extracted from the well reports 630 to fill the data gaps. The dashboard 604 may then again be visualized, with data gaps that were filled highlighted in the table 606 and the quality indicator 608 showing higher data quality.

Figure 7:
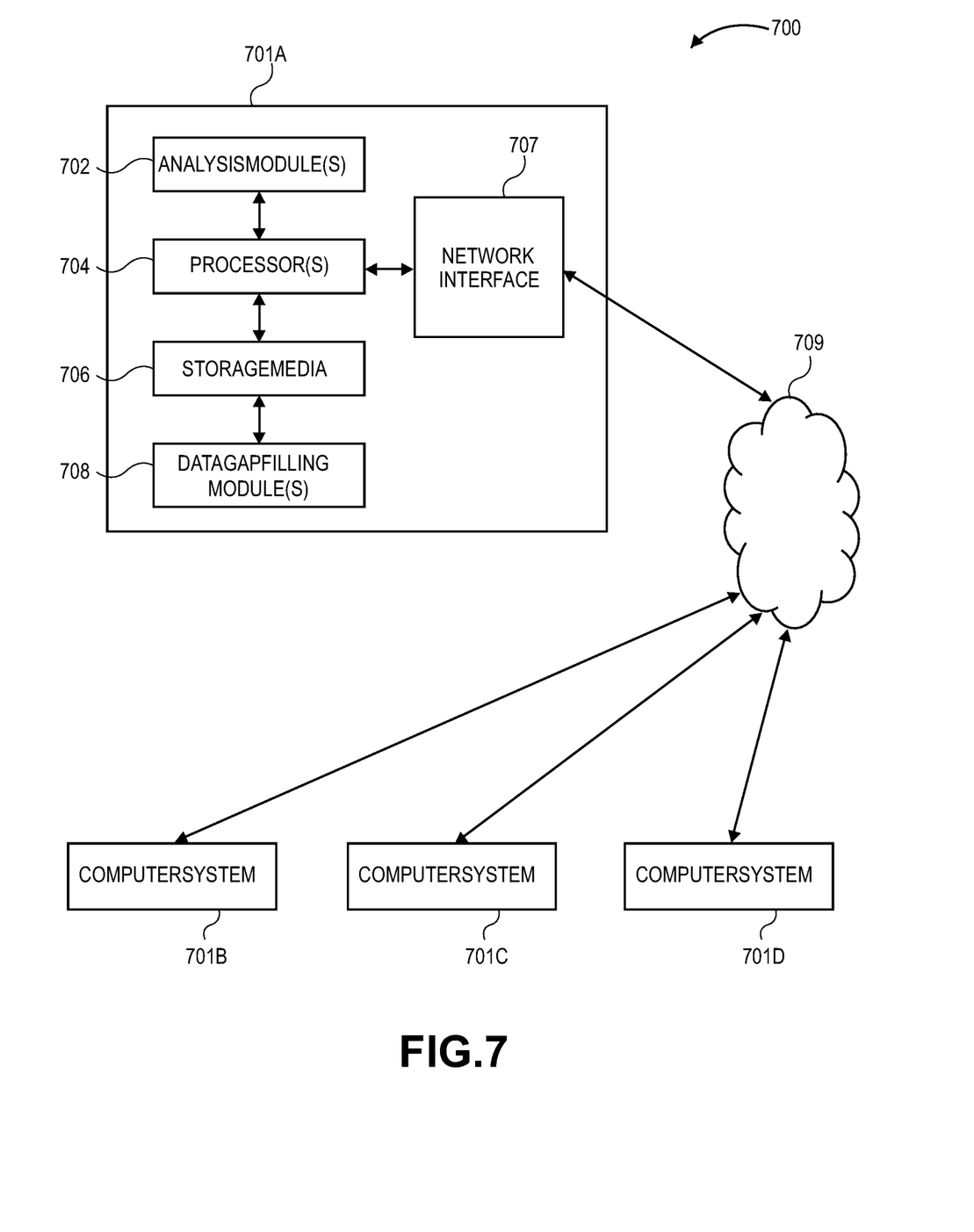
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more data gap filling module(s) 708. In the example of computing system 700, computer system 701A includes the data gap filling module 708. In some embodiments, a single data gap filling module may be used to perform some aspects of one or more embodiments of the methods disclosed herein. In other embodiments, a plurality of data gap filling modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method, comprising:
identifying and storing entities in a well record database comprising a first table including rows corresponding to a plurality of objects and columns corresponding to attributes of the objects;
determining and storing a data gap for at least one attribute of an object of the objects in the first table;
generating a second table including rows corresponding to the objects and columns corresponding to the data gap;
identifying and storing documents in a document database at least partially in response to the second table, wherein the documents comprise a plurality of different types of documents, and wherein identifying the documents comprises determining that the documents are relevant to the object based at least in part on metadata of the documents;
generating a third table including rows corresponding to the objects and columns corresponding to identifiers of the documents;
extracting values for the data gap at least partially in response to the third table using a machine learning model by:
ranking pages of the documents based on text in the documents;
selecting a subset of the pages based at least in part on the ranking;
extracting attribute-value pairings from the subset of the pages using the machine learning model, wherein the attribute-value pairings are in a raw schema; and
transforming the raw schema into a normalized schema;
generating a fourth table including rows corresponding to the identifiers of the documents and columns corresponding to types of the documents and the attribute-value pairings;

determining and storing a data gap filler at least partially in response to the fourth table, wherein the data gap filler is determined and stored by aggregating the extracted values;
inserting the data gap filler into the data gap in the first table to produce an updated first table;
displaying the updated first table with the data gap filler inserted into the data gap; and
performing a well operation based upon the well record database after the data gap filler is inserted into the data gap.

2. The method of claim 1, further comprising:
visualizing, in a dashboard presented in an interactive display to a user, a first quality of the well record database prior to inserting the data gap filler; and
visualizing, in the dashboard, a second quality of the well record database after inserting the data gap filler.

3. The method of claim 1, wherein ranking the pages based on the text comprises predicting a topic of the pages based on the text using the machine learning model, and ranking the pages based on the predicted topic.

4. The method of claim 1, further comprising:
standardizing the text of at least some of the different types of documents;
wherein inserting the data gap filler comprises merging a database constructed at least partially from the extracted attribute-value pairings and the well record database.

5. The method of claim 4, further comprising standardizing text of the well record database such that a schema of the well record database matches a schema of the standardized text of the at least some of the different types of documents.

6. The method of claim 1, wherein extracting the attribute-value pairings comprises:
feeding the text and images of the documents to the machine learning model, wherein the machine learning model comprises a convolutional neural network; and
applying a language model incorporating a transformer architecture and the convolutional neural network to extract the attribute-value pairings from the text and images.

7. The method of claim 1, wherein the entities comprise wells, wherein the well record data base comprises a well log database that comprises a first datastore generated by a first entity, and wherein the document database comprises a second datastore generated by a second entity that is different from the first entity.

8. A computing system, comprising:
one or more processors; and
a memory system comprising one or more non-transitory computer-readable media storing instructions that, when executed by at least one of the one or more processors, cause the computing system to perform operations, the operations comprising:
identifying and storing entities in a well record database comprising a first table including rows corresponding to a plurality of objects and columns corresponding to attributes of the objects;
determining and storing a data gap for at least one attribute of an object of the objects in the first table;
generating a second table including rows corresponding to the objects and columns corresponding to the data gap;
identifying and storing documents in a document database at least partially in response to the second table, wherein the documents comprise a plurality of different types of documents, and wherein identifying the documents comprises determining that the documents are relevant to the object based at least in part on metadata of the documents;
generating a third table including rows corresponding to the objects and columns corresponding to identifiers of the documents;
extracting values for the data gap at least partially in response to the third table using a machine learning model by:
ranking pages of the documents based on text in the documents;
selecting a subset of the pages based at least in part on the ranking;
extracting attribute-value pairings from the subset of the pages using the machine learning model, wherein the attribute-value pairings are in a raw schema; and
transforming the raw schema into a normalized schema;
generating a fourth table including rows corresponding to the identifiers of the documents and columns corresponding to types of the documents and the attribute-value pairings;
determining and storing a data gap filler at least partially in response to the fourth table, wherein the data gap filler is determined and stored by aggregating the extracted values;
inserting the data gap filler into the data gap in the first table to produce an updated first table;
displaying the updated first table with the data gap filler inserted into the data gap; and
performing a well operation based upon the well record database after the data gap filler is inserted into the data gap.

9. The computing system of claim 8, wherein the entities comprise wells, wherein the well record data base comprises a well log database that comprises a first datastore generated by a first entity, and wherein the document database comprises a second datastore generated by a second entity that is different from the first entity.

10. A non-transitory computer-readable medium storing instructions that, when executed by one or more processors of a computing system, cause the computing system to perform operations, the operations comprising:
identifying and storing entities in a well record database comprising a first table including rows corresponding to a plurality of objects and columns corresponding to attributes of the objects;
determining and storing a data gap for at least one attribute of an object of the objects in the first table;
generating a second table including rows corresponding to the objects and columns corresponding to the data gap;
identifying and storing documents in a document database at least partially in response to the second table, wherein the documents comprise a plurality of different types of documents, and wherein identifying the documents comprises determining that the documents are relevant to the object based at least in part on metadata of the documents;
generating a third table including rows corresponding to the objects and columns corresponding to identifiers of the documents;
extracting values for the data gap at least partially in response to the third table using a machine learning model by:
ranking pages of the documents based on text in the documents;

selecting a subset of the pages based at least in part on the ranking;
extracting attribute-value pairings from the subset of the pages using the machine learning model, wherein the attribute-value pairings are in a raw schema; and
transforming the raw schema into a normalized schema;
generating a fourth table including rows corresponding to the identifiers of the documents and columns corresponding to types of the documents and the attribute-value pairings;
determining and storing a data gap filler at least partially in response to the fourth table, wherein the data gap filler is determined and stored by aggregating the extracted values;
inserting the data gap filler into the data gap in the first table to produce an updated first table;
displaying the updated first table with the data gap filler inserted into the data gap; and
performing a well operation based upon the well record database after the data gap filler is inserted into the data gap.

11. The medium of claim 10, wherein ranking the pages based on the text comprises predicting a topic of the pages based on the text using the machine learning model, and ranking the pages based on the predicted topic.

12. The medium of claim 10, wherein the operations further comprise standardizing the text of at least some of the different types of documents, and wherein inserting the data gap filler comprises merging a database constructed at least partially from the extracted attribute-value pairings and the well record database.

13. The method of claim 1, further comprising performing an offset well analysis using the well record database after the data gap filler is inserted into the data gap.

14. The method of claim 1, further comprising controlling a parameter of a physical system based upon the well record database after the data gap filler is inserted into the data gap.

15. The method of claim 1, further comprising highlighting the data gap filler after the data gap filler is inserted into the data gap to indicate higher data quality.

16. The method of claim 1, wherein transforming the raw schema comprises converting units of the attributes and/or changing names of the attributes.

17. The method of claim 1, wherein the objects comprise wells, and wherein the attributes comprise a location and/or coordinates of the wells, depths of the wells, water depths in the wells, geometry in the wells, formation properties around the wells, or a combination thereof.

18. The method of claim 1, wherein ranking the pages based on the text comprises determining that one or more of the pages are relevant based upon repetition of a selected word or phrase, and wherein the ranking refers to a number of times that the selected word or phrase is repeated.

* * * * *